(12) United States Patent
Cho

(10) Patent No.: US 11,237,588 B2
(45) Date of Patent: Feb. 1, 2022

(54) PERIODIC PROCESS PERFORMING SYSTEM AND SYSTEM ON CHIP

(71) Applicant: Samsung Electronics Co., Ltd., Suwon-si (KR)

(72) Inventor: Dong Sik Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 238 days.

(21) Appl. No.: 16/041,005

(22) Filed: Jul. 20, 2018

(65) Prior Publication Data

US 2019/0179363 A1 Jun. 13, 2019

(30) Foreign Application Priority Data

Dec. 13, 2017 (KR) .................. 10-2017-0170935

(51) Int. Cl.
| | |
|---|---|
| G06F 1/10 | (2006.01) |
| G06F 1/3237 | (2019.01) |
| G06F 1/3287 | (2019.01) |
| G06F 1/3234 | (2019.01) |
| G06F 9/48 | (2006.01) |
| G06F 1/3206 | (2019.01) |
| G06F 1/28 | (2006.01) |
| G06F 9/4401 | (2018.01) |
| G06F 9/22 | (2006.01) |

(52) U.S. Cl.
CPC ................ *G06F 1/10* (2013.01); *G06F 1/28* (2013.01); *G06F 1/3206* (2013.01); *G06F 1/3237* (2013.01); *G06F 1/3243* (2013.01); *G06F 1/3287* (2013.01); *G06F 9/4418* (2013.01); *G06F 9/4887* (2013.01)

(58) Field of Classification Search
CPC . G06F 1/28; G06F 1/10; G06F 1/3206; G06F 1/3237; G06F 1/3243; G06F 1/3287; G06F 9/4418; G06F 9/4887; G06F 1/3203
See application file for complete search history.

(56) References Cited

U.S. PATENT DOCUMENTS

| | | | |
|---|---|---|---|
| 6,519,720 | B1 | 2/2003 | Mores |
| 8,571,505 | B2 | 10/2013 | Jin et al. |
| 8,774,050 | B2 | 7/2014 | Vasseur et al. |

(Continued)

FOREIGN PATENT DOCUMENTS

| | | |
|---|---|---|
| JP | 5555200 B2 | 7/2014 |
| KR | 2005-0077950 A | 8/2005 |
| KR | 10-1018465 B1 | 3/2011 |

*Primary Examiner* — Jaweed A Abbaszadeh
*Assistant Examiner* — Gayathri Sampath
(74) *Attorney, Agent, or Firm* — Harness, Dickey & Pierce, P.L.C.

(57) ABSTRACT

A periodic process performing system includes a system processor to which a first periodic real-time process, which starts to be executed starts for each of a first time interval from a first start time, is assigned; a wakeup logic which provides the system processor with a first state capable of executing the first periodic real-time process; and a counter which supplies a first tick signal to the wakeup logic for each of the first time interval from a second start time earlier than the first start time, and supplies a second tick signal to the system processor for each of the first time interval from a third start time between the first start time and the second start time.

20 Claims, 8 Drawing Sheets

(56) References Cited

U.S. PATENT DOCUMENTS

| | | |
|---|---|---|
| 9,146,606 B2 | 9/2015 | Huang et al. |
| 9,317,105 B2 | 4/2016 | Chueh et al. |
| 9,369,215 B2 | 6/2016 | Rudland et al. |
| 2004/0221187 A1* | 11/2004 | Durand ................ G06F 1/3203 713/300 |
| 2005/0235159 A1* | 10/2005 | Anandakumar .... G06F 3/03543 713/185 |
| 2007/0005995 A1* | 1/2007 | Kardach ................ G06F 1/324 713/300 |
| 2009/0172428 A1* | 7/2009 | Lee ....................... G06F 1/3287 713/300 |
| 2010/0076617 A1 | 3/2010 | Van den Keybus et al. |
| 2010/0077234 A1* | 3/2010 | Das ....................... G06F 1/3209 713/300 |
| 2013/0111092 A1* | 5/2013 | Heller .................... G06F 13/24 710/267 |
| 2013/0198540 A1* | 8/2013 | Lee ....................... G06F 1/3243 713/320 |
| 2014/0198697 A1 | 7/2014 | Jeanne et al. |
| 2016/0357248 A1* | 12/2016 | Lingutla ........... H04W 52/0209 |
| 2017/0206900 A1 | 7/2017 | Lee et al. |

* cited by examiner

1

PERIODIC PROCESS PERFORMING SYSTEM AND SYSTEM ON CHIP

This U.S. non-provisional application claims the benefit of priority under 35 U.S.C. § 119 to Korean Patent Application No. 10-2017-0170935 filed on Dec. 13, 2017 in the Korean Intellectual Property Office, the disclosure of which is incorporated herein by reference in its entirety.

BACKGROUND

Various example embodiments of the present disclosure relate to a periodic process performing system, method, non-transitory computer readable medium, and/or a system-on-chip including the same.

In many cases, a system processor such as an application processor (AP), partially turns off the power, or stops the clock signal, during a low power consumption mode in order to reduce the power consumption of the system processor and/or electronic device including the system processor. Therefore, there are cases where it is necessary to supply power and/or the clock signal again in order for the application processor to execute the process.

Since a real-time processor which performs a periodic real-time process required to be executed at a precisely fixed clock cycle intervals may exist outside the system processor, such as an application processor, the real-time processor is always turned on. Therefore, there was no need to provide another tick (e.g., clock) signal to the real-time processor.

However, recently, real-time processors have been built into and/or integrated with the application processor. The system processor, such as the application processor, may not be supplied with a clock signal and/or power in a low power consumption mode. Therefore, in order to execute a process in which a system processor, such as an application processor, needs to be accurately executed at a fixed cycle, there may be a need for a preparation procedure for executing the process (for example, a procedure of receiving power and/or a clock signal). In this case, since the time required for a preparation procedure is not specified, there is a problem that is difficult for a system processor, such as an application processor, to perform processes which require accurately execution based on a fixed clock cycle. Therefore, there is a growing need to utilize a tick signal such that the periodic real-time process included in the system processor can be accurately scheduled.

SUMMARY

An aspect of at least one example embodiment provides a periodic process performing system for performing a process desired, useful for, and/or required to be accurately executed at a fixed cycle (e.g., intervals of a fixed clock cycle).

Another aspect of at least one example embodiment allows for a periodic real-time process to be accurately scheduled, by utilizing a plurality of tick signals.

Various example embodiments are not limited to those mentioned above, and other aspects which are not mentioned can be clearly understood by those skilled in the art from the description below.

According to an aspect of at least one example embodiment, there is provided a periodic process performing system including a system processor configured to periodically execute a first periodic real-time process for a plurality of first time intervals starting at a first start time, a wakeup logic configured to transmit at least one signal which causes the system processor to enter a first state capable of executing the first periodic real-time process, and a counter configured to supply a first tick signal to the wakeup logic for each of the plurality of first time intervals at a second start time, the second start time earlier than the first start time, and supply a second tick signal to the system processor for each of the plurality of first time intervals at a third start time, the third start time between the first start time and the second start time.

According to another aspect of at least one example embodiment, there is provided a periodic process performing system including a system processor configured to periodically execute a first periodic real-time process for a plurality of first time intervals starting at a first start time, a counter configured to generate a first tick signal for each of the plurality of first time intervals starting at a second start time, the second start time earlier than the first start time, a power management unit configured to supply power to the system processor, a clock management unit configured to supply a clock signal to the system processor, a wakeup logic configured to control the power management unit and the clock management unit to supply the power and the clock signal to the system processor based on the first tick signal, the counter is further configured to generate a second tick signal for each of the plurality of first time intervals starting at a third start time, the third start time between the first start time and the second start time, and the system processor is further configured to start execution of the first periodic real-time process based on the second tick signal.

According to still another aspect of at least one example embodiment, there is provided a system-on-chip device including an interface configured to receive requests from a host for a task to be periodically executed, a periodic process performing system configured to execute a first periodic real-time process related to the requested task, the first periodic real-time process is a process which starts to be executed at the start of each first time interval of a plurality of first time intervals, the plurality of first time intervals calculated from a first start time, the periodic process performing system includes a system processor configured to execute the first periodic real-time process, a counter configured to generate a first tick signal for each of the plurality of first time intervals from a second start time, the second start time earlier than the first start time, and generate a second tick signal for each of the plurality of first time intervals from a third start time, the third start time between the first start time and the second start time, and a wakeup logic configured to receive the first tick signal from the counter to transmit at least one signal which causes the system processor to enter a first state capable of executing the first periodic real-time process, and the system processor is configured to set the second start time, the third start time, and the first time interval in the counter when the first period real-time process is allocated to the system processor, and start execution of the first periodic real-time process based on the second tick signal.

BRIEF DESCRIPTION OF THE DRAWINGS

The above and other aspects and features of various example embodiments will become more apparent by describing in detail example embodiments thereof with reference to the attached drawings, in which.

DETAILED DESCRIPTION

Figure 1:
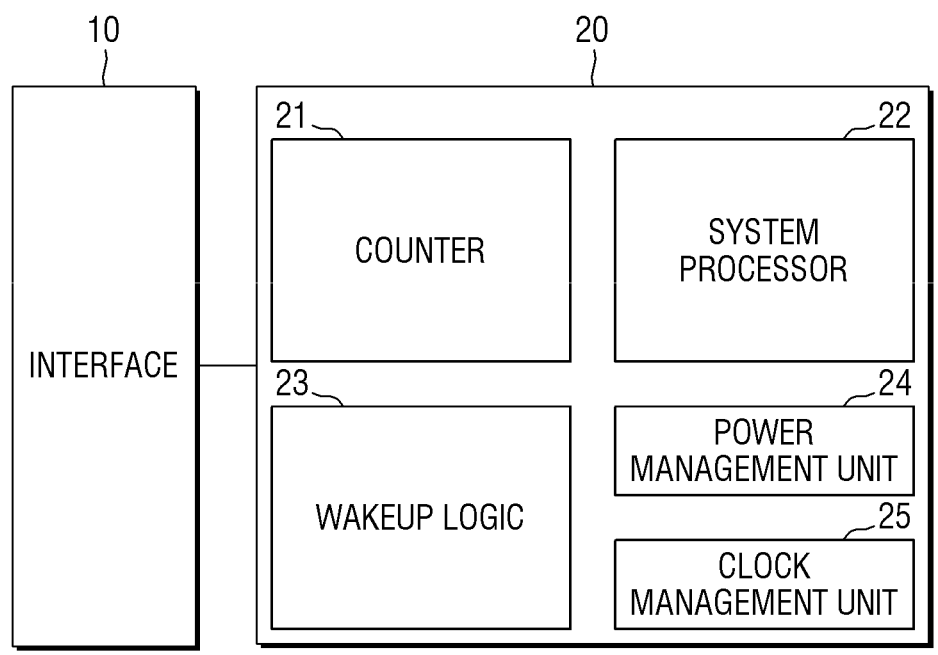
FIG. 1 is a block diagram for explaining an example of a system-on-chip including a periodic process performing system according to at least one example embodiment.

FIG. 1 is a block diagram for explaining an example of a system-on-chip including a periodic process performing system according to at least one example embodiment.

Referring to FIG. 1, a system-on-chip 1 may include an interface 10 and/or a periodic process performing system 20, etc. However, the example embodiments are not limited thereto and the system-on-chip 1 may have components more or less than the above listed components.

The system-on-chip 1 may be a system-on-a-chip (SoC) included in a computing and/or processing device, such as a mobile computing device, etc., but is not limited thereto. For example, the SoC may be included in a personal computer, a server, a laptop, a mobile phone, a smart phone, an EDA (enterprise digital assistant), a digital still camera, a digital video camera, a PMP (portable multimedia player), a PND (personal navigation device or portable navigation device), a mobile internet device (MID), a wearable computer, an internet of Things (IOT) device, an Internet of Everything (IOE) device, an e-book, a virtual reality device, an augmented reality device, a gaming console, etc.

The interface 10 may transmit and/or receive data, instructions, task requests, and the like to and/or from a host. For example, the interface 10 may receive a task request from the host.

The interface 10 may be connected to the host via a wired interface and/or bus, such as a PATA (bus parallel AT attachment bus), a SATA bus (serial AT attachment bus), a SCSI interface, a USB interface, a PCIe interface, and the like. However, the example embodiments are not limited thereto and the SoC 1 may communicate with a host via a wireless interface as well.

When the interface 10 is requested for a periodically executed task from the host, the periodic process performing system 20 may perform the periodic real-time process.

Here, the periodic real-time process is a process that is performed only for a desired and/or preset time period after being accurately executed at a fixed cycle (e.g., a clock cycle, clock interval, etc.), and should not be started earlier or later than the given time. The periodic real-time process is referred to as a periodic process below.

The periodic process performing system 20 may include a counter 21, a system processor 22, a wakeup logic 23, a power management unit 24, and/or a clock management unit 25, etc. However, the example embodiments are not limited to the above-described components, and the periodic process performing system 20 may have more or less components than the above listed components.

The counter 21 may be used to count based on an input signal, including counting the time based on a clock input signal. For example, the counter 21 may receive the clock (e.g., clock signal) from the oscillator and may count the number of times the received clock is toggled (e.g., transitions from 0 to 1, or 1 to 0, etc.), the number of times of the rising edge of the received clock, and/or the number of times of the falling edge of the received clock to count the time, etc.

The counter 21 may generate a tick signal at a desired and/or preset time interval and output the tick signal. For example, the counter 21 may generate the first tick signal at a first time interval from a first start time.

The counter 21 may also generate a plurality of tick signals having different start times and output the plurality of tick signals at different times (e.g., separate times). For example, the counter 21 may generate a first tick signal at a first time interval from the first start time, and may generate a second tick signal at a second time interval from a second start time, etc.

The counter 21 can supply a plurality of tick signals having different start times to the wakeup logic 23 and/or the system processor 22, respectively. For example, the counter 21 may supply the first tick signal generated at the first time interval from the first start time to the wakeup logic 23, and/or may supply the second tick signal generated at the second time interval from the second start time to the system processor 22, etc., but the example embodiments are not limited thereto.

The wakeup logic 23 may form a state in which the system processor 22 can perform the periodic process in accordance with the reception of the first tick signal from the counter 21, but the example embodiments are not limited thereto.

The system processor 22 can perform the periodic process in accordance with the reception of the second tick signal from the counter 21, but the example embodiments are not limited thereto.

In order for the system processor 22 to perform the periodic process, power and/or a clock need to be supplied to the system processor 22.

According to at least one example embodiment, in order for the system processor 22 to perform the periodic process, before the system processor 22 receives the second tick signal, the wakeup logic 23 first receives the first tick signal. The reason is that the wakeup logic 23 needs to receive the first tick signal in order to cause the system processor 22 to change to a state capable of performing the periodic process (e.g., to wake the system processor 22 up from a no-power and/or low-power mode, etc.).

The second tick signal is supplied to the system processor 22 after the system processor 22 changes to a state capable of performing the periodic process. Thus, when the periodic process is assigned to the system processor 22, the system processor 22 may set the first start time of the first tick signal, the second start time of the second tick signal, and the time related to the generation cycle of the first tick signal and the second tick signal, based on the counter 21.

The system processor 22 may control the overall operation of the periodic process performing system. Also, the system processor 22 may perform the execution various processes executed in the periodic process performing system and/or store the data associated with the various processes executed by the system. The system processor 22 may drive an operating system (OS), an application, a database manager, etc., for driving the periodic process performing system, but the example embodiments are not limited thereto.

The system processor 22 may be a CPU (Central Processing Unit), a co-processor, an APU (Arithmetic Processing Unit), a GPU (Graphic Processing Unit), a DSP (Digital Signal Processor), an AP (Application Processor), a CP (Communication Processor), and the like, but the example embodiments are not limited thereto.

The wakeup logic 23 can provide a state in which the system processor 22 can perform the process. Here, a state in which the system processor 22 can perform the process may be a state in which clock and/or power are supplied to the system processor 22, but the example embodiments are not limited thereto.

The power management unit 24 can manage the power supplied to the system processor 22. For example, the power management unit 24 can supply power to the system processor 22 in accordance with the control of the wakeup logic 23, but is not limited thereto.

The clock management unit 25 can manage the clock (e.g., clock signal) supplied to the system processor 22. For example, the clock management unit 25 generates a clock through a phase locked loop (PLL) circuit, a delay locked loop (DLL) circuit, and the like, in accordance with the control of (e.g., a control signal received from) the wakeup logic 23, and may supply the clock to the system processor 22. The method for supplying the clock to the system processor 22 will be described in more detail later with reference to FIG. 9.

Figure 2:
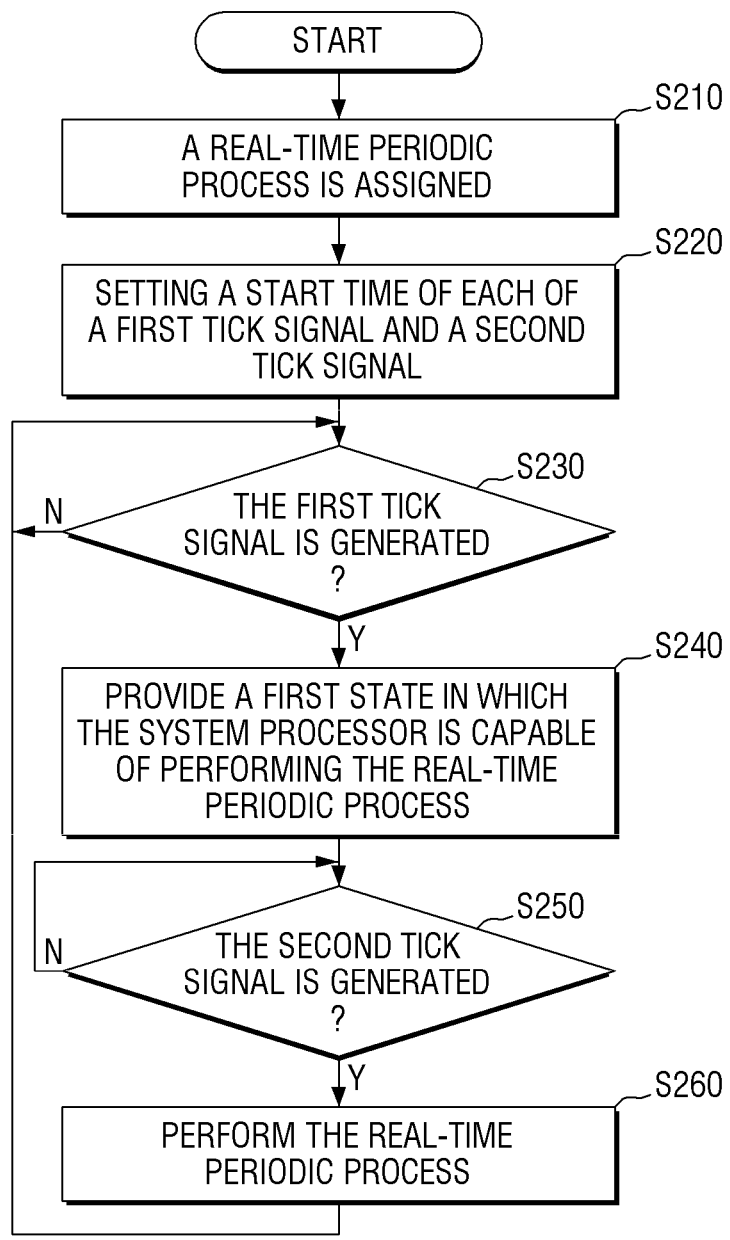
FIG. 2 is a flowchart illustrating an example of a method for performing a periodic process in the periodic process performing system according to some example embodiments.
Figure 3:
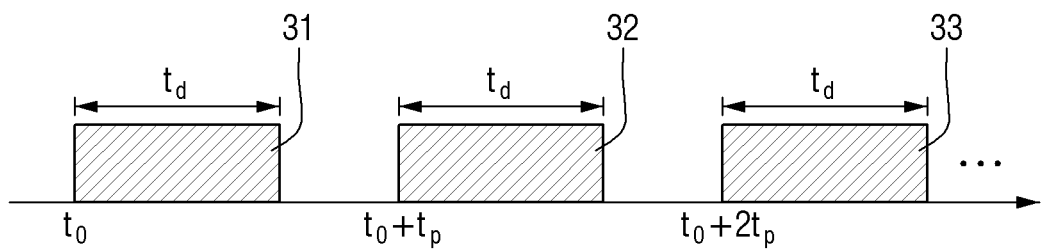
FIG. 3 is a diagram illustrating an example of a periodic process that is performed by the periodic process performing system according to some example embodiments.
Figure 4:
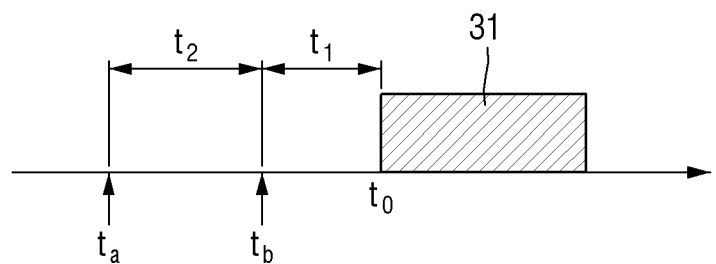
FIG. 4 is a diagram for explaining an example of a method for generating a start time of a tick signal in the periodic process performing system according to some example embodiments.
Figure 5:
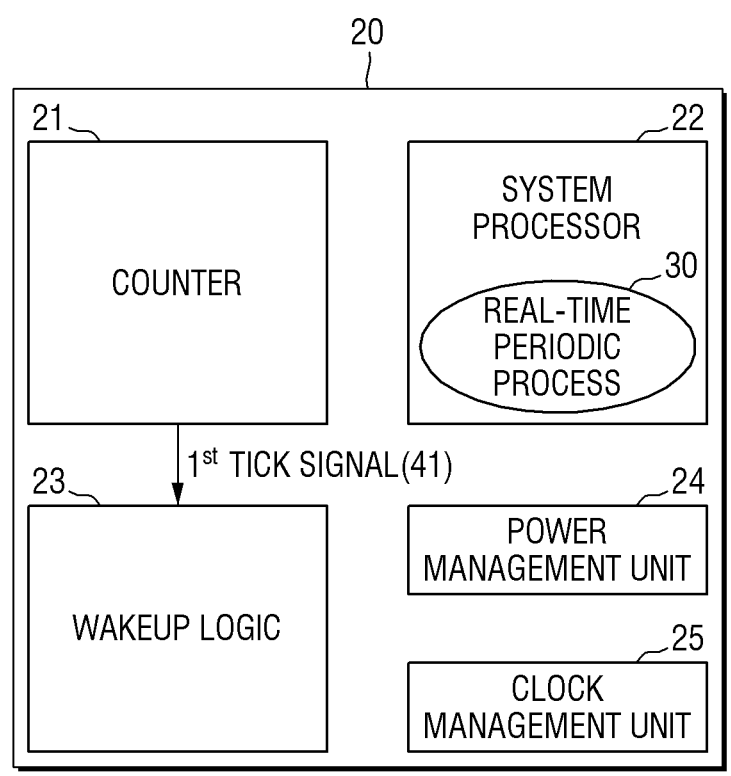
FIG. 5 is a diagram for explaining an example of the method for performing the periodic process in the periodic process performing system according to some example embodiments.
Figure 6:
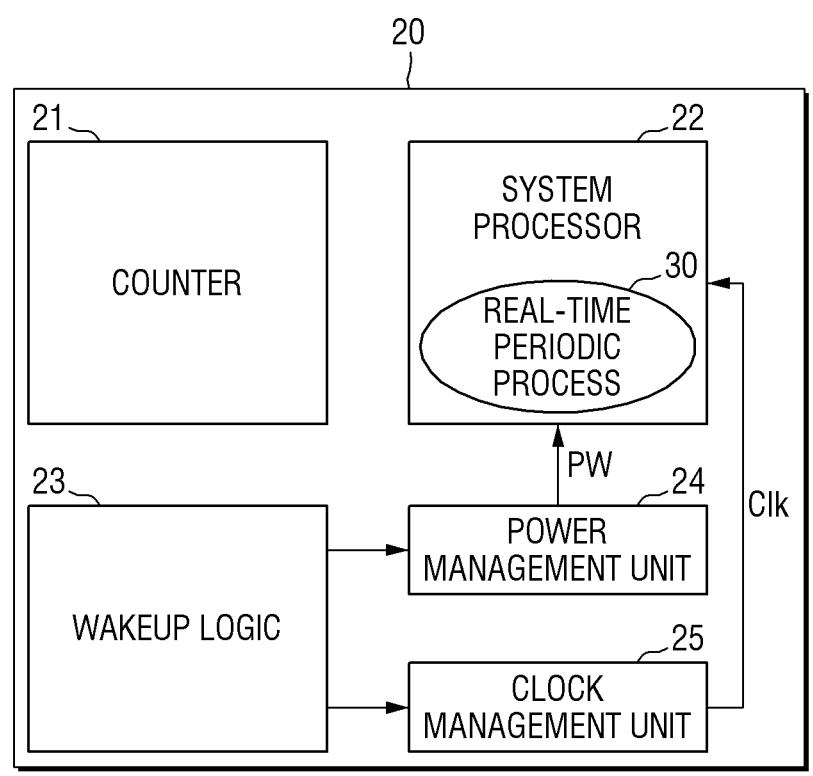
FIG. 6 is a diagram for explaining an example of the method for performing the periodic process in the periodic process performing system according to some example embodiments.
Figure 7:
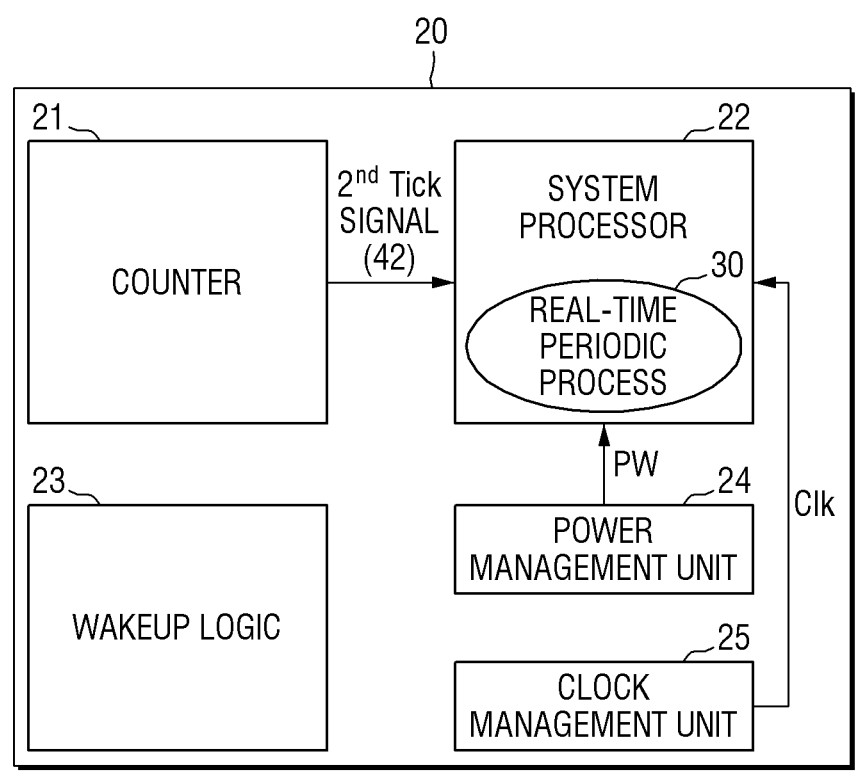
FIG. 7 is a diagram for explaining an example of the method for performing the periodic process in the periodic process performing system according to some example embodiments.

FIG. 2 is a flowchart illustrating an example of a method for performing the periodic process in the periodic process performing system according to some example embodiments. FIG. 3 is a diagram illustrating an example of the periodic process performed by the periodic process performing system according to some example embodiments. FIG. 4 is a diagram for explaining an example of a method for generating a start time of a tick signal in the periodic process performing system according to some example embodiments. FIGS. 5 to 7 are diagrams for explaining an example of the method for performing the periodic process in the periodic process performing system according to some example embodiments.

Referring to FIG. 2, the periodic process can be assigned to the system processor (e.g., system processor 22 of FIG. 1) (S210).

Referring to FIG. 3, the periodic process may be a process that is executed exactly for each interval of a first time $t_p$ from a first start time $t_0$, and is completed when a desired and/or preset time $t_d$ has elapsed. Here, the desired and/or preset time $t_d$ can be shorter than the first time $t_p$.

For example, a periodic process 31 executed first starts at the first start time $t_0$, and can be completed when the desired and/or preset time $t_d$ has elapsed.

A periodic process 32 executed second may start at the time $(t_0+t_p)$ after the first time $t_p$ has elapsed from the first start time $t_0$, and may be completed when the desired and/or preset time $t_d$ has elapsed.

A periodic process 33 executed third may start at the time $(t_0+2t_p)$ after the first time $t_p$ has elapsed from the third time $(t_0+t_p)$, and may be competed when the desired and/or preset time $t_d$ has elapsed.

FIG. 3 shows the processes up to the periodic process 33 executed third. However, even after the periodic process 33 is executed third, execution of the process can be started continuously at the interval of the first time $t_p$.

Referring again to FIG. 2, the system processor 22 may set the start times of each of the first tick signal and the second tick signal based on the counter (e.g., counter 21 of FIG. 1) when the periodic process is assigned (S220). Here, the start time of the first tick signal may be faster (e.g., earlier) than the first start time at which the periodic process is initially started, and the start time of the second tick signal may be present between the start time of the first tick signal and the first start time, however the example embodiments are not limited thereto and the clock period (and/or the start time) of the first tick signal may be greater, equal to, or lesser, than the clock period of the second tick signal, etc. Additionally, a greater or lesser number of tick signals may be generated according to other example embodiments.

For example, referring to FIG. 4, the system processor 22 may set a second start time $t_a$ of the first tick signal and a third start time $t_b$ of the second tick signal based on the counter 21, when the periodic process is assigned. Here, the first tick signal may be a signal supplied to the wakeup logic (e.g., wakeup logic 23 of FIG. 1), and the second tick signal may be a signal supplied to the system processor 22, but the example embodiments are not limited thereto.

Further, the system processor 22 may set the time interval at which the first tick signal is generated and the time interval at which the second tick signal is generated, on the counter 21. The time interval at which the first tick signal is generated and the time interval at which the second tick signal is generated can be the same as the time interval at which execution of the periodic process is started, but is not limited thereto.

The third start time $t_b$ of the second tick signal may be faster (e.g., earlier) than the first start time $t_0$ of the periodic process 31 executed first by the second time $t_1$. Here, the second time $t_1$ may correspond to the time desired, useful for, and/or required until executing the periodic process after the system processor 22 is supplied with the second tick signal. However, the second time $t_1$ is not limited thereto, and the second time $t_1$ may be longer than the desired, useful for, and/or required time until executing the periodic process after the system processor 22 is supplied with the second tick signal.

In the case where the periodic process is executed in accordance with reception of the second tick signal while the clock and power are being supplied to the system processor 22, the second time $t_2$ may be decisive without change. Therefore, in order to be able to start the periodic process at the correct cycle, the state of being supplied with clock and power needs to be provided to the system processor before the second tick signal is supplied. That is, it is desired that the first tick signal be supplied to the wakeup logic before the second tick signal is supplied to the system processor. Therefore, the first tick signal will be described in more detail below.

The second start time $t_a$ of the first tick signal may be faster (e.g., earlier) than the third start time $t_b$ of the second tick signal by a third time $t_2$. Here, the third time $t_2$ may correspond to the desired, useful for, and/or required time until providing the state capable of executing the periodic process to the system processor 22, after the wakeup logic 23 is supplied with the first tick signal. However, the third time $t_2$ is not limited thereto, and the third time $t_2$ may be longer than the desired, useful for, and/or required time until providing the state capable of executing the periodic process to the system processor 22 after the wakeup logic 23 is supplied with the first tick signal.

The length of the second time $t_1$ may be different from the length of the third time $t_2$. However, the example embodiments are not limited thereto, and the length of the second time $t_1$ may correspond to the length of the third time $t_2$, etc.

Referring again to FIG. 2, when the start times of each of the first tick signal and the second tick signal are set in step (S220), the counter can generate the first tick signal and the second tick signal at the desired and/or preset time intervals. On the other hand, the wakeup logic 23 can recognize whether or not the first tick signal has occurred (S230).

For example, referring to FIG. 5, when a periodic process 30 is allocated to the system processor 22, the system processor 22 may set the first start time related to the first tick signal 41 and the time related to the generation cycle of the first tick signal 41 based on the counter 21. In this case, the counter 21 can generate the first tick signal 41 for each desired and/or preset time interval from the first start time.

The wakeup logic 23 can periodically receive the first tick signal 41 generated by the counter 21. When receiving the first tick signal 41 from the counter 21, the wakeup logic 23 can recognize that the first tick signal was generated.

Referring again to FIG. 2, when recognizing that the first tick signal has not been generated (N in S230), the wakeup logic (23 of FIG. 1) can check (e.g., continuously check, periodically check, check at a desired time, etc.) whether or not the first tick signal has been generated.

On the other hand, when recognizing that the first tick signal has been generated (Y in S230), the wakeup logic 23 may provide the first state capable of executing the periodic process to the system processor 22 (S240).

Referring to FIG. 6, in accordance with reception of the first tick signal, the wakeup logic 23 can control the power management unit 24 and/or the clock management unit 25 such that power (PW) and/or clock (Clk) (e.g., signal) are provided to the system processor 22. The state in which the power (PW) and/or clock (Clk) are provided to the system processor 22 can be a first state in which the system processor 22 can execute the periodic process, such as a normal state, etc.

As an example, the wakeup logic 23 can receive the first tick signal in a state in which the system processor 22 is not supplied with power (PW) nor the clock (Clk). In this case, the wakeup logic 23 can control the power management unit 24 and the clock management unit 25 so that power (PW) and the clock (Clk) are supplied to the system processor 22.

As another example, the wakeup logic 23 can receive the first tick signal in a state in which the system processor 22 is supplied with power (PW) but is not supplied with the clock (Clk). In this case, the wakeup logic 23 can control the power management unit 24 and the clock management unit 25 so that power (PW) and the clock (Clk) are supplied to the system processor. However, since power (PW) is supplied to the system processor 22, the wakeup logic 23 can control the power management unit 24 so that the supply of power (PW) can be maintained, and the wakeup logic 23 can control the clock management unit 25 so that the clock (Clk) is additionally supplied to the system processor 22.

As another example, when the wakeup logic 23 receives the first tick signal, in a state in which the system processor 22 is supplied with power (PW) and clock (Clk), the wakeup logic 23 can control the power management unit 24 and the clock management unit 25 so that the supply of power (PW) and the clock (Clk) to the system processor is maintained.

As another example, when the wakeup logic 23 receives the first tick signal, in a state in which the system processor 22 is supplied with the clock (Clk) but no power (PW), the wakeup logic 23 can control the power management unit 24 and the clock management unit 25 so that the power (PW) is supplied to the system processor and the clock (Clk) is maintained.

Referring again to FIG. 4, the third time $t_2$ can correspond to the time desired, useful for, and/or required for changing to a state in which power and clock are supplied to the system processor 22 from a state in which power and/or the clock are not supplied to the system processor 22.

However, the example embodiments are not limited thereto. For example, the third time $t_2$ may be longer than the time desired, useful for, and/or required for changing to a state in which power and/or the clock are supplied to the system processor 22 from a state in which power and/or the clock are not supplied to the system processor 22, etc.

Referring again to FIG. 2, the system processor 22 can recognize whether a second tick signal has occurred (S250). When recognizing that the second tick signal has not been generated (N in S250), the system processor 22 can check (e.g., continuously check, periodically check, check at a desired time, etc.) whether or not the second tick signal has been generated.

On the other hand, when recognizing that the second tick signal has occurred (Y in S250), the system processor 22 can execute the periodic process (S260). The system processor 22 can receive the second tick signal in a state in which the periodic process can be executed.

For example, referring to FIG. 7, when receiving the second tick signal 42, the system processor 22 can recognize that the second tick signal 42 has been generated.

Since the system processor 22 has received the second tick signal in a state in which the periodic process 30 can be executed, the periodic process can directly proceed without going through another preparation procedure (for example, a procedure of receiving the supply of power and clock, etc.).

The system processor 22 most ideally performs the periodic process 30 as soon as it receives the second tick signal 42. However, it is virtually impossible for the system processor 22 to perform the periodic process 30 immediately upon receipt of the second tick signal 42. In other words, there may be delay before the system processor 22 is able to execute a process after receiving a clock signal, such as the second tick signal 42. Therefore, the system processor 22 can start execution of the periodic process 30 when a desired and/or certain period (e.g., delay period, etc.) of time has elapsed after receiving the second tick signal 42. Here, the desired and/or certain period of time can be decisive. Therefore, when the periodic process is assigned, the system processor 22 can calculate the second start time of the second tick signal and set the second start time on the counter 21 on the basis of the desired and/or certain period of time. Further, the counter 21 can generate the second tick signal at the desired and/or preset time interval from the second start time.

On the other hand, referring again to FIG. 2, since the periodic process is a process that is executed (e.g., continuously executed, periodically executed, executed once, etc.) at a desired and/or preset time interval, the performing system of the periodic process can repeatedly execute steps (S230 to S260).

Figure 8:
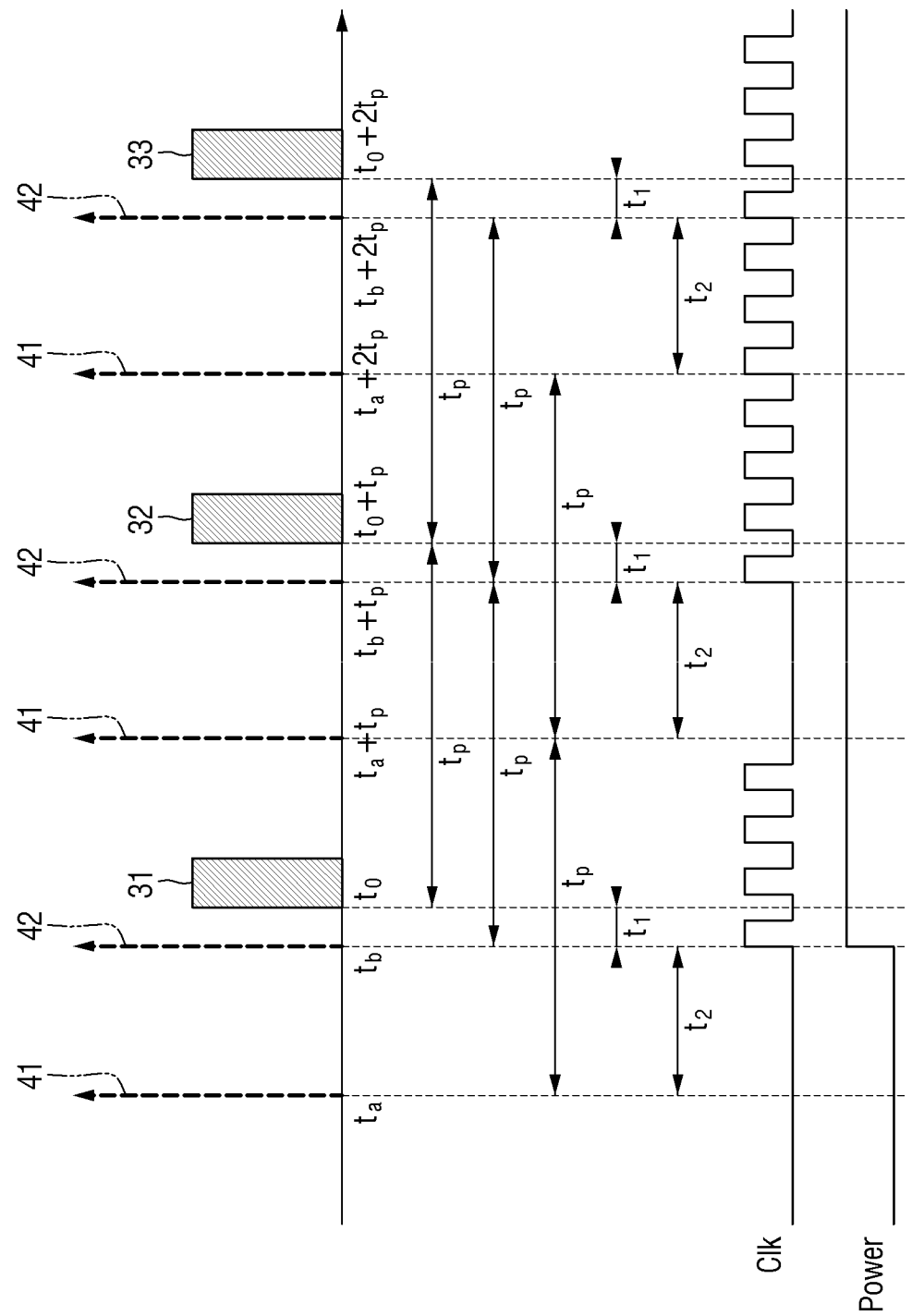
FIG. 8 is a timing diagram for explaining an example of the method for generating the tick signal in the periodic process performing system according to some example embodiments.

FIG. 8 is a timing diagram illustrating an example of a method for generating the tick signal in the periodic process performing system according to some example embodiments.

Referring to FIG. 8, periodic processes (e.g., a plurality of processes 31, 32, 33, etc.) at which execution starts for each interval of the first time $t_p$ from the first start time $t_0$ can be assigned to the system processor. In this case, the system processor can set the second start time $t_a$ of the first tick signal 41, the third start time $t_b$ of the second tick signal 42, etc., and the time related to the cycle generated by each of the tick signal 41 and the second tick signal 42, based on the counter. Here, the time related to the cycle generated by each of the first tick signal 41 and/or the second tick signal 42 can correspond to the first time $t_p$, but the example embodiments are not limited thereto.

The system processor can set the third start time $t_b$ before the second time $t_1$ from the first start time $t_0$ of the periodic process 31 executed first, on the counter. Here, the second time $t_1$ can correspond to the time desired, useful for, and/or required until the periodic process is executed after the system processor is supplied with the second tick signal 42. However, the example embodiments are not limited thereto, and, for example, the second time may be longer than the time desired, useful for, and/or required until the periodic process is executed after the system processor is supplied with the second tick signal 42, etc.

The counter can generate the second tick signal 42 at intervals of the first time $t_p$ from the third start time $t_b$, but is not limited thereto. For example, the counter can generate the second tick signal 432 at each of the third start time $t_b$, the time $(t_b+t_p)$ after elapse of the first time $t_p$ has elapsed from the third start time $t_b$, and the time $(t_b+2t_p)$ after twice the first time $t_p$ has elapsed from the third start time $t_b$, etc.

The system processor can set the second start time $t_a$ before the third time $t_2$ different from the second time $t_1$ from the third start time $t_b$, etc., based on the counter. Here, the third time $t_2$ can correspond to the time desired, useful for, and/or required for supplying power and clock to the system processor. However, the example embodiments are not limited thereto, and the second time may be, for example, longer than the time desired, useful for, and/or required for providing power and/or clock to the system processor, etc.

The counter can generate the first tick signal 41 at intervals of the first time $t_p$ from the second start time $t_a$, etc. For example, the counter can generate the first tick signal 41 at each of the second start time $t_a$, the time $(t_a+t_p)$ after the first time $t_p$ has elapsed from the second start time $t_a$, and the time $(t_a+2t_p)$ after twice the first time $t_p$ has elapsed from the second start time $t_a$.

The counter can supply the first tick signal 41 to the wakeup logic when generating the first tick signal 41. The wakeup logic may provide the system processor with a first state in which the periodic process may be performed, in accordance with the reception of the first tick signal 41.

As an example, the clock management unit and/or the power management unit included in the wakeup logic can make the first state in which clock and/or the power are supplied to the system processor in accordance with the reception of the first tick signal 41 at the second start time $t_a$. In this case, the clock and/or the power can be supplied to the system processor at the third start time $t_b$.

As another example, the clock management unit and the power management unit included in the wakeup logic may receive the first tick signal 41 at the time $(t_a+t_p)$ after the first time $t_p$ has elapsed from the second start time $t_a$. At the time $(t_a+t_p)$, only power is supplied to the system processor, and no clock is supplied. Thus, the power management unit can continue to supply power to the system processor, and the clock management unit can additionally supply the clock to the system processor. In this case, a clock can be additionally supplied to the system processor at the time $(t_b+t_p)$ after the first time $t_p$ has elapsed from the third start time $t_b$.

As another example, the clock management unit and the power management unit included in the wakeup logic can receive the first tick signal 41, at the time $(t_a+2t_p)$ after twice the first time $t_p$ has elapsed from the second start time $t_a$. At the time $(t_a+2t_p)$, the power and the clock are supplied to the system processor. Therefore, the power management unit and the clock management unit can continuously supply the power and the clock to the system processor.

As a result, the wakeup logic starts to provide the clock and/or the power to the system processor at, for example, each of the second start time $t_a$, the time $(t_a+t_p)$ after twice the first time $t_p$ has elapsed from the second start time $t_a$, and the time $(t_a+2t_p)$ after twice the first time $t_p$ has elapsed from the second start time $t_a$, and may make a first state in which the system processor can execute the periodic process.

On the other hand, if the system processor is in the first state in which the periodic process can be performed, the system processor can receive the second tick signal 42 from the counter. The system processor can start the execution of the periodic processes (e.g., processes 31, 32, 33, etc.) at the time when the second time $t_1$ elapses in accordance with reception of the second tick signal 42.

For example, the system processor can receive the second tick signal 42 at each of the third start time $t_b$, the time $(t_b+t_p)$ after the first time $t_p$ has elapsed from the third start time $t_b$, and the time $(t_b+2t_p)$ after twice the first time $t_p$ has elapsed from the third start time $t_b$. Therefore, the execution of the periodic process can be started at each of the first start time $t_0$, the time $(t_0+t_p)$ after the first time $t_p$ has elapsed from the first start time $t_0$, and the time $(t_0+2t_p)$ after twice the first time $t_p$ has elapsed from the first time $t_0$.

If the periodic process is executed using only the second tick signal 42, without the first tick signal 41, the time during which the process is actually executed may vary.

As an example, if the system processor receives the second tick signal 42 in the state in which the power and the clock are not supplied to the system processor, the system processor is supplied with the power and clock, and thereafter, the system processor may execute the periodic process. That is, the desired, useful for, and/or required time for receiving power and clock needs to be additionally elapsed, so that execution of the periodic process can be started.

As another example, when the system processor receives the second tick signal 42 in a state in which only power is supplied to the system processor and no clock is supplied, the system processor is supplied with clock and then may execute the periodic process. That is, the desired, useful for, and/or required time for receiving clock needs to be additionally elapsed, so that execution of the periodic process can be started.

That is, in the case where only the second tick signal 42 is used with no first tick signal 41, the system processor has a problem that it is difficult to start execution of the periodic process at a precisely determined time.

However, according to some example embodiments described above, since the periodic process performing system supplies the power and/or the clock to the system processor before receiving the second tick signal, there is an effect capable of executing the periodic process at accurate timing.

Figure 9:
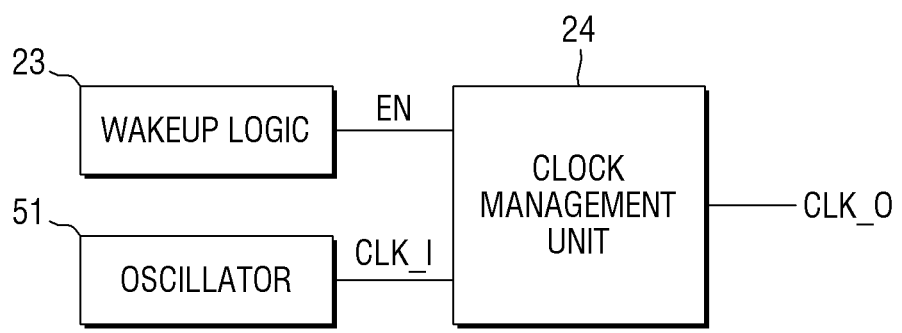
FIG. 9 is a diagram for explaining an example of a method for supplying a clock to the system processor via a clock management unit in the periodic process performing system according to some example embodiments.

FIG. 9 is a diagram illustrating an example of a method for supplying a clock to a system processor via a clock management unit in the periodic process performing system according to some example embodiments.

Referring to FIG. 9, a wakeup logic 23 may transmit an enable signal EN to a clock management unit 25 in accordance with the reception of the first tick signal.

The clock management unit 25 may be supplied with the first clock (Clk_I) via an oscillator 51.

In accordance with the reception of the enable signal EN, the clock management unit 25 can generate a second clock (Clk_O) to be supplied to at least one system processor, using the first clock (Clk_I).

For example, the clock management unit 25 includes a phase locked loop (PLL) circuit, a delay locked loop (DLL) circuit, and the like, and may generate the second clock (Clk_O), and supply the second clock (Clk_O) to the system processor, in accordance with reception of the enable signal EN.

In concluding the detailed description, those skilled in the art will appreciate that many variations and modifications can be made to the example embodiments without substantially departing from the principles of the present disclosure. Therefore, the disclosed example embodiments are used in a generic and descriptive sense only and not for purposes of limitation.

What is claimed is:

1. A periodic process performing system comprising:
a system processor configured to periodically execute a first periodic real-time process for a plurality of first time intervals starting at a first start time;
wakeup logic circuitry configured to transmit at least one signal which causes the system processor to enter a first state capable of executing the first periodic real-time process;
a counter configured to supply a first tick signal to the wakeup logic circuitry for each of the plurality of first time intervals at a second start time, the second start time earlier than the first start time, and supply a second tick signal to the system processor for each of the plurality of first time intervals at a third start time, the third start time between the first start time and the second start time; and
the system processor is further configured to start execution of the first periodic real-time process based on the second tick signal and a clock signal, the clock signal generated in response to the first tick signal.

2. The periodic process performing system of claim 1, further comprising:
power management circuitry configured to supply power to the system processor;
clock management circuitry configured to supply the clock signal to the system processor; and
the wakeup logic circuitry is further configured to control the power management circuitry and the clock management circuitry so that the power and the clock signal are provided to the system processor based on the first tick signal.

3. The periodic process performing system of claim 1, wherein the system processor is further configured to set the first start time, the second start time, and the plurality of first time intervals on the counter when the first periodic real-time process is allocated to the system processor.

4. The periodic process performing system of claim 3, wherein the system processor is further configured to set the third start time before a second time interval expires, the second time interval calculated from the first start time.

5. The periodic process performing system of claim 4, wherein the second time interval corresponds to the time required for execution of the first periodic real-time process after the second tick signal is supplied to the system processor.

6. The periodic process performing system of claim 4, wherein the second time interval is longer than the time required for execution of the first periodic real-time process after the second tick signal is supplied to the system processor.

7. The periodic process performing system of claim 4, wherein the system processor is further configured to set the second start time before a third time interval expires, the third time interval calculated from the third start time.

8. The periodic process performing system of claim 7, wherein the third time interval corresponds to the time required for the system processor to enter the first state.

9. The periodic process performing system of claim 7, wherein the third time interval is longer than the time required for the system processor to enter the first state.

10. A periodic process performing system comprising:
a system processor configured to periodically execute a first periodic real-time process for a plurality of first time intervals starting at a first start time;
a counter configured to generate a first tick signal for each of the plurality of first time intervals starting at a second start time, the second start time earlier than the first start time;
power management circuitry configured to supply power to the system processor;
clock management circuitry configured to supply a clock signal to the system processor;
wakeup logic circuitry configured to transmit signals to the power management circuitry and the clock management circuitry, respectively, based on the first tick signal;
the counter is further configured to generate a second tick signal for each of the plurality of first time intervals starting at a third start time, the third start time between the first start time and the second start time; and
the system processor is further configured to start execution of the first periodic real-time process based on the second tick signal and the clock signal from the clock management circuitry.

11. The periodic process performing system of claim 10, wherein the system processor is further configured to set the first start time, the second start time, and the plurality of first time intervals in the counter when the first periodic real-time process is allocated to the system processor.

12. The periodic process performing system of claim 11, wherein the system processor is further configured to set the third start time before a second time interval expires, the second time interval calculated from the first start time.

13. The periodic process performing system of claim 12, wherein the second time interval corresponds to the time required for execution of the first periodic real-time process after the second tick signal is supplied to the system processor.

14. The periodic process performing system of claim 12, wherein the system processor is further configured to set the second start time before a third time interval expires, the third time interval calculated from the third start time.

15. The periodic process performing system of claim 14, wherein the third time interval corresponds to the time required for supplying the power and the clock signal to the system processor.

16. A system-on-chip device comprising:
- an interface configured to receive requests from a host for a task to be periodically executed; and
- a periodic process performing system configured to execute a first periodic real- time process related to the requested task,
- the first periodic real-time process being a process which starts to be executed at the start of each first time interval of a plurality of first time intervals, the plurality of first time intervals calculated from a first start time;
- the periodic process performing system includes,
  - a system processor configured to execute the first periodic real-time process,
  - a counter configured to generate a first tick signal for each of the plurality of first time intervals from a second start time, the second start time earlier than the first start time, and
    - generate a second tick signal for each of the plurality of first time intervals from a third start time, the third start time between the first start time and the second start time, and
  - wakeup logic circuitry configured to receive the first tick signal from the counter, and transmit at least one signal which causes the system processor to enter a first state capable of executing the first periodic real-time process, and the system processor is further configured to,
  - set the second start time, the third start time, and the plurality of first time intervals in the counter when the first period real-time process is allocated to the system processor, and
  - start execution of the first periodic real-time process based on the second tick signal and a clock signal, the clock signal generated in response to the first tick signal.

17. The system-on-chip device of claim 16, wherein the system processor is further configured to set the third start time before a second time interval expires, the second interval calculated from the first start time.

18. The system-on-chip device of claim 17, wherein the second time corresponds to the time required for execution of the first periodic real-time process after the second tick signal is supplied to the system processor.

19. The system-on-chip device of claim 17, wherein the system processor is further configured to set the second start time before a third time interval expires, the third time interval calculated from the third start time.

20. The system-on-chip device of claim 19, wherein the third time interval corresponds to the time required for the system processor to enter the first state.

* * * * *